Jan. 28, 1964     C. R. ADAMS     3,119,639

HYDROSTATIC BEARING

Filed Jan. 9, 1962

*INVENTOR.*
CLARENCE R. ADAMS
BY
Theron N. Nichols
AGENT

United States Patent Office 3,119,639
Patented Jan. 28, 1964

3,119,639
HYDROSTATIC BEARING
Clarence R. Adams, Kirkland, Wash., assignor to The Boeing Company, Seattle, Wash., a corporation of Delaware
Filed Jan. 9, 1962, Ser. No. 165,724
12 Claims. (Cl. 308—9)

This invention pertains to a high load capacity hydrostatic or fluid bearing.

More particularly, this invention consists of an improved step bearing over the basic step bearing that I originally invented and disclosed in a patent application Serial Number 781,326, now abandoned, and an improvement over the various step bearings disclosed in a later filed copending patent application Serial Number 55,574, filed September 12, 1960 now Patent No. 3,101,224. A principal feature of the instant bearing is the incorporation therein of a floating sleeve or annulus between the bearing surfaces. The result is a great reduction in leakage without any diminishing of load carrying capacity.

In all prior fluid supported bearings, no means has been provided for supporting high loads on the bearings and, at the same time, for maintaining the bearings adequately spaced from each other in the prevention of rubbing and scoring.

Heretofore, upon application of a load to a shaft rotatably mounted in a housing and supported therein by fluid under pressure between the shaft and its housing, the shaft is displaced in its housing in the direction of the application of the load until the displacing force is balanced, if possible, with a large increase in pressure and flow of fluid, or until the shaft rubs against its housing causing scoring of the bearing surfaces therebetween. In any event, greater leakage of fluid results with increased load and pressure.

A principal object of this invention is to provide at least two embodiments of a bearing that will support greater loads than obtainable heretofore with no increase in leakage.

Another object of this invention is to provide a hydrostatic bearing having freely floating means between the complementary surfaces thereof for maintaining a higher pressure between the surfaces with no greater loss of fluid.

A further object of this invention is to provide a hydrostatic bearing that will support heavy loads without increased leakage including an annulus having at least one stepped surface positioned between the complementary bearing surfaces.

An additional object of this invention is to provide a hydrostatic bearing between two elements for supporting heavy loads without increased leakage including a freely floating annulus having a stepped surface cooperating with a bearing surface of one of the elements and having a second stepped surface cooperating with a bearing surface of the other element.

A still further object of this invention is to provide a hydrostatic bearing having means comprising an annulus freely floating between two complementary and contiguous bearing surfaces for maintaining a higher pressure between the surfaces with no increased loss of fluid.

Another object of this invention is to provide a hydrostatic bearing having means comprising an annulus freely floating between two complementary and contiguous bearing surfaces and a spring means for urging the annulus away from one of the bearing surfaces.

Other objects and various advantages of the disclosed high load capacity floating sleeve step bearing will be apparent from the following detailed description, together with the accompanying drawings, submitted for purposes of illustration only and not intended to define the scope of the invention, reference being had for that purpose to the subjoined claims.

Briefly, this invention comprises at least two embodiments of a hydrostatic bearing. Each of the disclosed hydrostatic bearings has a pair of complementary and spaced apart or contiguous bearing surfaces, one surface having a recess therein whereby a step is formed in the surface at the periphery of the recess. A free floating annulus is positioned internally of the recess for control of exit of the high pressure fluid injected into the recess. This annulus has a stepped surface cooperating with the recessed bearing surface and a stepped surface cooperating with the complementary bearing surface. Thus a very efficient high load capacity floating sleeve or annulus step bearing is formed having decreased flow of fluid therethrough.

Of the two exemplary embodiments disclosed, one hydrostatic bearing is designed to utilize the forces of gravity for maintaining its annulus spaced from one bearing surface and the other bearing incorporates a spring for urging its annulus away from one bearing surface.

The drawings diagrammatically illustrate by way of example, not by way of limitation, two forms of the invention wherein like reference numerals designate corresponding parts in the several views in which.

The invention disclosed herein is not limited in its application to the method and details of construction and arrangement of parts shown and described, since the invention is capable of other embodiments and of being practiced or carried out in various other ways. Also it is to be understood that the phraseology or terminology employed herein is for the purpose of description and not of limitation.

While the high load capacity hydrostatic bearings disclosed are shown as applicable principally as thrust bearings, the main features of these bearings may be utilized in various other configurations and in many forms.

Likewise, although the lubricant utilized here in the disclosed hydrostatic bearings is a liquid, other suitable fluids may be supplied under pressure as oil, water, steam, vapor, air, etc., depending on the requirements of the particular bearing.

All figures disclose various embodiments of the invention. To conventional fluid bearings having opposite corresponding bearing surfaces adapted to receive fluid under high pressure for supporting one surface on the other, the disclosed invention adds a recess or chamber in one of the bearing surfaces and a floating means, as an annulus, in the recess whereby the exit or exhaust flow of fluid from the recess and thus from between the bearing surfaces is retarded.

Figure 1:
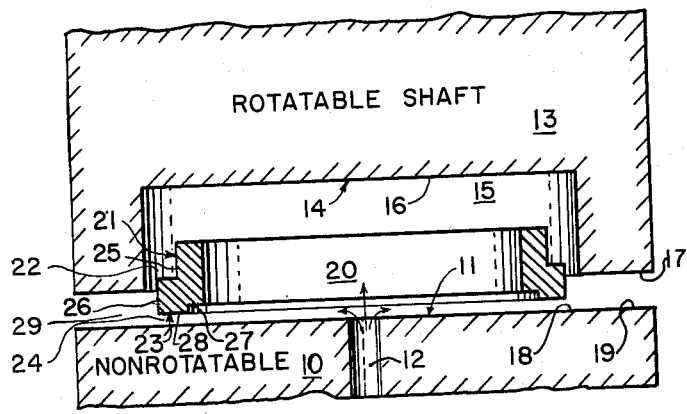
FIG. 1 is a vertical cross sectional view of one embodiment of the high load capacity floating annulus step bearing.

FIG. 1 discloses the preferred embodiment of a high capacity fluid or hydrostatic bearing. A non-rotatable element 10, the supporting element of FIG. 1, may be a fixed shaft, or the like, having a bearing surface 11 supplied with an operating fluid at high pressure from a fluid supply conduit 12.

A rotatable element or shaft 13 having a concave or recessed bearing surface 14 corresponding with or complementary to bearing surface 11 is supported on and contiguous to the fixed supporting element 10.

The first feature of the invention is a recess or concavity 15 formed in the bearing surface 14, the recess being supplied with fluid from the conduit 12. The bearing surface 14 comprises the concave surface 16 of the recess 15 and the peripheral surface 17 circumscribing the recess. With the principal portion 16 of the bearing surface 14 forming the complementary bearing surface to the major or inner portion 18 of the bearing surface 11, the outer peripheral bearing surface portion 17 of surface 14 is complementary to the outer bearing surface portion 19 of surface 11 to form the exit exhaust passage 29.

A second feature of the new hydrostatic bearing is an annulus 20 freely floating in the recess or chamber 15. Annulus 20 has an upper stepped bearing surface 21, as viewed in FIG. 1, forming with the recess surface 16 a first fluid exhaust passage 22, for centering the annulus in the recess. Likewise, the annulus 20 has a lower stepped bearing surface 23 forming with the inner bearing surface portion 18 a second fluid exhaust passage 24 for supporting the annulus in floating position in the recess. First fluid passage 22 permits only a small amount of fluid to exhaust due to its reduced section having the stepped surface 21 consisting of steps 25 and 26. Both fluid passages 22 and 24 exhaust into the third fluid exhaust passage 29 formed by the supporting element bearing surface outer portion 19 and the supported element bearing surface peripheral portion 17.

In operation of the embodiment of FIG. 1, fluid is injected between the bearing surfaces 11 and 14 of the supporting and supported elements and into the recess 15 from the fluid supply conduit 12. The fluid, while providing supporting forces is metered out from between the bearing surfaces due to both the stepped bearing surface 14 formed by the recess 15 therein, and due to the floating annulus for restraining the exhausting fluid flow.

It may be noted likewise, that if the substantially flat bearing surface 18 and its complementary bearing surface 28 are too smooth to permit the starting of a flow of fluid therebetween when the annulus 20 is in static position or at rest on the supporting bearing surface in no fluid flow status, a groove, or the like fluid vent is formed in one of the complementary bearing surfaces to insure an immediate start of fluid flow therebetween.

Figure 2:
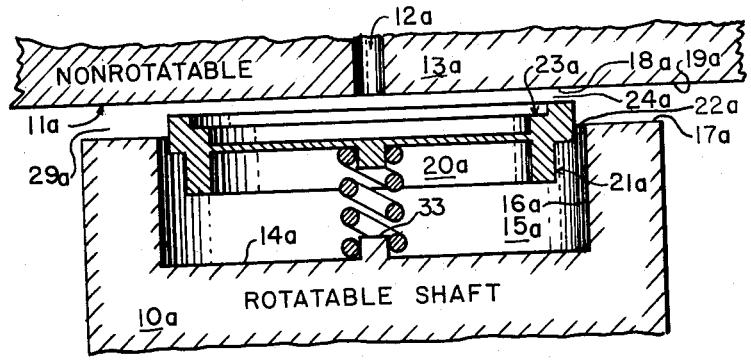
FIG. 2 is a vertical cross sectional view of a modification of the embodiment of FIG. 1.

FIG. 2 discloses the result of another method of the invention similar to that of FIG. 1, but illustrating the supply conduit 12a being positioned in the non-rotatable element 13a and supplying fluid to the recess 15a from above, illustrating that the fluid supply conduit may be in various positions as desired and convenient. Since the recess 15a is formed in the lower surface 14a of the hydrostatic bearing such as in a rotatable shaft shown in FIG. 2, means, such as a spring, or the like, may be utilized other than gravity for maintaining the annulus 20a forced up against the non-recessed bearing surface 11a in no fluid flow state.

Figure 3:
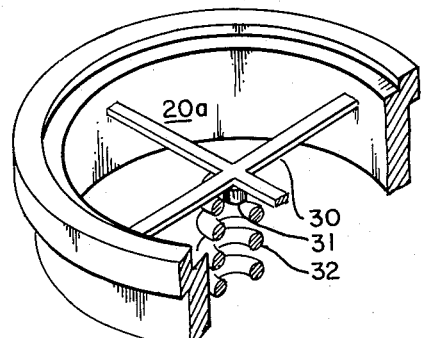
FIG. 3 is a perspective view of the annulus of FIG. 2 with parts shown in section.

FIG. 3 discloses details of the exemplary annulus 20a utilized in the modification of FIG. 2. In this embodiment suitable supports, such as cross-bars 30 with protuberance 31 are secured to the annulus of FIG. 1 whereby a compression spring 32, FIG. 3 is fitted over and extends from a protuberance 33, FIG. 2, for maintaining the annulus contiguous with the upper bearing surface 11a.

While the recesses and annuli of both embodiments are illustrated as being circular, obviously both may be square, rectangular, or of any other desired geometric shape.

The operation of the embodiment of FIG. 2 is similar to that of FIG. 1 in that immediately upon injection of fluid between the two bearing surfaces 11a and 14a from supply conduit 12a the fluid will flow radially outwardly and be metered through exhaust passages 22a and 24a to 29a.

The passage 22a is formed by the stepped surface 21a and its complementing contiguous bearing surface 16a for maintaining the annulus centered in the cavity 15a, and the passage 24a is formed by the stepped surface 23a and its complementary contiguous bearing surface 18a for resisting the force of the spring 32, FIG. 3, for maintaining the annulus spaced from the surface 11a, FIG. 2. Fluid exhaust passage 29a is formed by peripheral bearing surface portion 17a and peripheral bearing surface portion 19a, all bearing surfaces serving the principal function of metering the exhaust fluid flow.

Typical flow rates obtained in the embodiment of FIG. 1, using liquid, for example, are as follows. From a 2.5 inch diameter step bearing having a gap of .004 inch and supporting a load of 30 pounds as shown in FIG. 1, but without the annulus, resulted in a fluid flow rate of 19.2 gallons per hour. Then from the same bearing supporting the same load but with the annulus therein, a fluid flow rate of 4.7 gallons per hour resulted.

Accordingly at least two different embodiments of hydrostatic bearings have been disclosed. One embodiment includes a gravity supported free floating annulus positioned in a recessed bearing surface of a pair of complementary surfaces, and the other embodiment includes a spring urged free floating annulus positioned between two complementary bearing surfaces in a recess in one of the surfaces.

While only two embodiments of the invention have been shown in the accompanying drawings, it will be evident that various other modifications may be utilized in the arrangement and construction of the new high load capacity floating annulus step bearing without departing from the scope of the invention.

I claim:
1. A hydrostatic bearing comprising,
   (a) a first element having a first bearing surface,
   (b) a second element having a second bearing surface corresponding to said first bearing surface,
   (c) one of said bearing surfaces having a recess therein,
   (d) means for supplying fluid to said recess positioned in said non-recessed bearing surface element whereby said second bearing surface is maintained spaced from said first bearing surface as the fluid escapes from between said surfaces, and
   (e) freely floating annular means having at least one stepped surface cooperating with the bearing surfaces for retarding the flow of fluid from said recess.

2. A hydrostatic bearing as recited in claim 1 wherein,
   (a) said second bearing surface has a recess therein, and
   (b) said recess is positioned above said first surface whereby the forces of gravity are in the direction tending to move said freely floating annular means away from said recess.

3. A hydrostatic thrust bearing as recited in claim 1 wherein,
   (a) said first element is a non-rotatable element,
   (b) said second element is a rotatable shaft, and
   (c) said second surface has the recess therein and is the end of said rotatable shaft supported on said non-rotatable element.

4. A hydrostatic thrust bearing as recited in claim 1 wherein,
   (a) said first element is a rotatable shaft,
   (b) said second element is a non-rotatable element, and
   (c) said recess is formed in the end of said rotatable shaft.

5. A hydrostatic bearing as recited in claim 1 wherein,
   (a) said freely floating annular means has two surfaces,
   (b) one of said surfaces of said floating means being contiguous with the surface of the recess formed in said second bearing surface to form a first fluid exhausting passage, and
   (c) the other of said two surfaces of said floating means being contiguous with said first bearing surface to form a second fluid exhausting passage.

6. A hydrostatic bearing as recited in claim 5 wherein,
 (a) one of said two surfaces forming said first fluid exhausting passage comprises a stepped surface
 (b) said stepped surface comprising a first portion and a second portion
 (c) said first portion being parallel to said second bearing surface, and
 (d) said second portion being parallel to said second bearing surface and spaced a lesser distance therefrom.

7. A hydrostatic bearing as recited in claim 5 wherein,
 (a) one of said two surfaces forming said second fluid exhausting passage comprises a stepped surface,
 (b) said stepped surface comprises a first portion and a second portion,
 (c) said first portion being parallel to said first bearing surface, and
 (d) said second portion being parallel to said first bearing surface and spaced a lesser distance therefrom.

8. A hydrostatic bearing as recited in claim 5 wherein,
 (a) one of said two surfacse forming said first fluid exhausting passage comprises a stepped surface,
 (b) said stepped surface comprising a first portion and a second portion,
 (c) said first portion being parallel to said second bearing surface, and
 (d) said second portion being parallel to said second bearing surface and spaced a lesser distance therefrom, and
 (e) one of said two surfaces forming said second fluid exhausting passage comprising a stepped surface,
 (f) said last mentioned stepped surface comprising a first portion and a second portion,
 (g) said last mentioned first portion being parallel to said first bearing surface, and
 (h) said last mentioned second portion being parallel to said first bearing surface and spaced a lesser distance therefrom.

9. A hydrostatic bearing comprising,
 (a) a supporting element having a first bearing surface,
 (b) means for supplying fluid to said first bearing surface,
 (c) a supported element having a second bearing surface contiguous with said first bearing surface,
 (d) a recess in said second bearing surface positioned opposite to said fluid supply means whereby fluid flows into said recess before exhausting from between said surfaces at the periphery of said recess, and
 (e) freely floating means positioned in said recess,
 (f) said freely floating means retarding the flow of fluid from said recess.

10. A high load hydrostatic step bearing having,
 (a) first and second pairs of complementary bearing surfaces in which the clearance between the first pair of complementary bearing surfaces is greater than the clearance between the second pair of complementary bearing surfaces,
 (b) means cooperating with one surface of said first pair of complementary bearing surfaces for causing fluid to flow from between said first pair of complementary bearing surfaces to said second pair of complementary bearing surfaces, and
 (c) floating annular means having at least one stepped surface positioned between said first pair of complementary bearing surfaces,
 (d) said floating annular means retarding said flow of fluid.

11. A hydrostatic bearing comprising,
 (a) a first element having a first bearing surface,
 (b) a second element having a second bearing surface corresponding to said first bearing surface,
 (c) means cooperating with one surface of said first pair of complementary bearing surfaces for supplying fluid between said surfaces for maintaining said bearing surfaces separated as the fluid escapes from between said bearing surfaces, and
 (d) freely floating annular means having at least one stepped surface, said freely floating annular means retarding the flow of fluid from between said bearing surfaces.

12. A hydrostatic bearing comprising:
 (a) a first element having a bearing surface,
 (b) a second element having a second bearing surface corresponding to said first bearing surface,
 (c) one of said bearing surfaces having a recess therein,
 (d) means for supplying fluid to said recess positioned in said non-recessed bearing surface element whereby said second bearing surface is maintained spaced from said first bearing surface as the fluid escapes from between said surfaces, and
 (e) floating annular means having at least one stepped surface for retarding the flow of fluid from said recess comprising:
  (1) an annulus, and
  (2) spring means, said spring means maintaining said annulus spaced from the surface of said recess.

References Cited in the file of this patent

UNITED STATES PATENTS

| | | |
|---|---|---|
| 2,873,683 | Sherwood | Feb. 17, 1959 |
| 2,976,087 | Cherubim | Mar. 21, 1961 |